(12) United States Patent
Henson

(10) Patent No.: US 8,526,897 B2
(45) Date of Patent: Sep. 3, 2013

(54) CONTROLLING POWER CONSUMPTION IN A RADIO TUNER

(75) Inventor: Matthew Henson, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 184 days.

(21) Appl. No.: 12/938,451

(22) Filed: Nov. 3, 2010

(65) Prior Publication Data
US 2012/0108191 A1     May 3, 2012

(51) Int. Cl.
*H04B 1/18*     (2006.01)

(52) U.S. Cl.
USPC .............. 455/160.1; 455/234.1; 455/323; 455/334; 375/324

(58) Field of Classification Search
USPC .......... 455/150.1, 160.1, 161.1, 161.2, 232.1, 455/234.1, 323, 334; 375/324
See application file for complete search history.

(56) References Cited

U.S. PATENT DOCUMENTS

| | | | |
|---|---|---|---|
| 7,339,503 B1 | 3/2008 | Elenes | |
| 7,483,501 B1 | 1/2009 | Michaels | |
| 7,555,065 B1 * | 6/2009 | Lou et al. | 375/316 |
| 8,224,254 B2 | 7/2012 | Haykin | |
| 2002/0172270 A1 | 11/2002 | Whikehart | |
| 2008/0298515 A1 | 12/2008 | Peyla | |
| 2011/0039492 A1 * | 2/2011 | Johnson et al. | 455/3.05 |
| 2012/0028567 A1 | 2/2012 | Marko | |

OTHER PUBLICATIONS

U.S. Appl. No. 12/894,316, filed Sep. 30, 2010, entitled "Detecting Digital Radio Signal," by Javier Elenes, et al.
Ibiquity Digital, "HD Radio, How it Works," copyright date 2011 (actual publication date unknown), 2 pages.
U.S. Patent and Trademark Office, Office Action mailed Nov. 6, 2012, with Reply filed Feb. 6, 2013, in U.S. Appl. No. 12/894,316.
U.S. Patent and Trademark Office, Requirement for Restriction/Election mailed Aug. 1, 2012, with Response filed Aug. 27, 2012 in U.S. Appl. No. 12/894,316.

\* cited by examiner

*Primary Examiner* — Nhan Le
(74) *Attorney, Agent, or Firm* — Trop, Pruner & Hu, P.C.

(57) ABSTRACT

According to one aspect of the present invention, a controller is coupled to at least first and second signal processors (at least one of which includes analog demodulation circuitry and another of which includes digital demodulation circuitry). The controller may operate to disable the first signal processor responsive to a control signal that indicates that a second signal (corresponding to a demodulator output) is available from the second signal processor.

10 Claims, 6 Drawing Sheets

CONTROLLING POWER CONSUMPTION IN A RADIO TUNER

BACKGROUND

Digital radios have been introduced to enable reception of a new digital radio spectrum that provides improved fidelity, as well as additional features. Currently in the United States, digital radio is available over-the-air using sidebands to an analog carrier signal. The current system as commercialized in the United States is referred to as so-called HD™ radio. By way of these sidebands, a broadcaster can provide one or more additional complementary channels to an analog carrier signal.

Accordingly, digital or HD™ radios can receive these signals and digitally demodulate them to provide a higher quality audio signal that includes the same content as an analog radio signal, or to provide additional content to the analog radio signal such as supplementary broadcasting available on one or more supplemental digital channels.

Typically, a digital radio tuner is incorporated in a radio solution that also includes a conventional analog spectrum receiver for handling demodulation of the analog carrier signal. In a digital radio for use in a home or automobile environment, demodulation for both the analog and digital signals can run concurrently, as power consumption is not a concern. However, in a portable device, power consumption by the demodulator that is not being used can adversely affect battery life.

SUMMARY OF THE INVENTION

According to one aspect, the present invention is directed to an apparatus having a receiver front end circuit to receive and process multiple radio frequency (RF) signals and to output downconverted signals corresponding to these signals. In turn, a first signal processor can be coupled to the receiver front end circuit to receive and process the downconverted signals to output a first signal obtained from content of a first RF signal (and which may correspond to an analog encoded signal). Further, a second signal processor can be coupled to the receiver front end circuit to receive and process the downconverted signals to output a second signal obtained from content of a second RF signal (and which may correspond to a digital encoded signal). In addition, the apparatus may include a controller coupled to the signal processors to disable the first signal processor responsive to a first control signal that indicates that the second signal is available from the second signal processor.

In one embodiment, the apparatus is a single radio tuner included on a single semiconductor die. Also in this embodiment, the first signal processor may include an analog demodulator (which may be implemented in digital circuitry) and the second signal processor may include a digital demodulator. The controller may receive the first control signal from a host processor to indicate that the second signal is available from the digital demodulator, where the host processor generates the first control signal responsive to receipt of a blend control signal from the digital demodulator. Sometime after disabling the analog demodulator, the controller can enable it responsive to a second control signal that indicates that the second signal will no longer be available from the digital demodulator.

Yet another aspect is directed to an apparatus that includes an analog demodulator to receive and process a first downconverted signal obtained from a RF signal to output a first signal obtained from analog encoded content of the RF signal, a blending circuit to blend the first signal and a second signal that is obtained from digitally encoded content of the RF signal, and a controller to disable the analog demodulator responsive to an indication that the second signal is available. In some embodiments this second signal may be obtained from a digital demodulator that outputs the second signal. The controller can enable the analog demodulator responsive to the digital demodulator indicating that the second signal will no longer be available from the digital demodulator.

A still further aspect is directed to a method that includes receiving a blend control signal in a controller that indicates that a limited number of valid demodulated samples from a digital demodulator that demodulates digitally encoded content in a RF signal remain in a buffer. Responsive to this signal, an analog demodulator can be initialized, where the analog demodulator demodulates analog encoded content in the RF signal. After the analog demodulator has been initialized, it can be used to generate an analog demodulated output from a downconverted signal obtained from the RF signal. After this initialization and demodulating, the analog demodulated signal and at least some of the limited number of valid demodulated samples can be blended to generate a blended output. In some implementations, this blended output can be provided to an audio processor.

DETAILED DESCRIPTION

Figure 1:
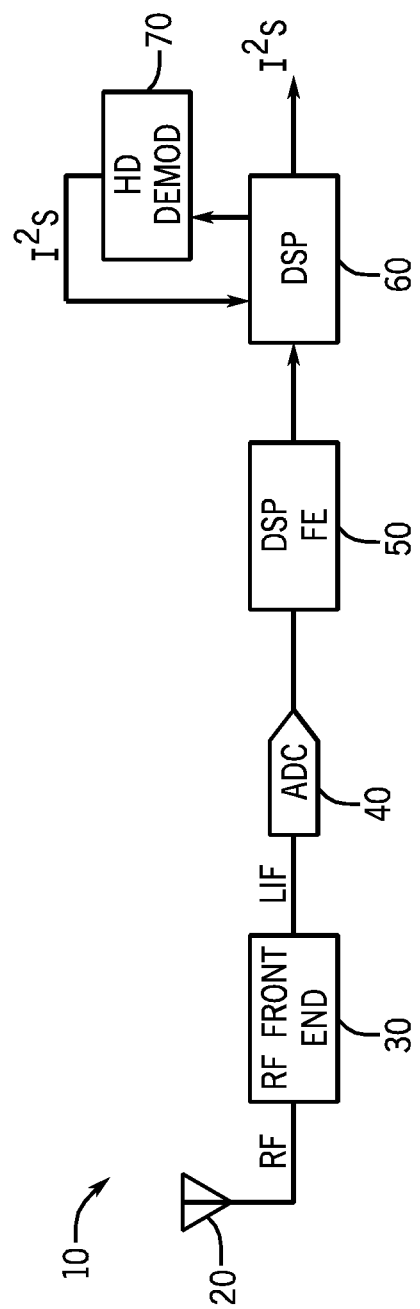
FIG. 1 is a block diagram of a radio receiver in accordance with an embodiment of the present invention.

In various embodiments, a radio tuner can be configured to receive multiple incoming radio frequency (RF) signals. That is, a single tuner, which may have a single downconverter such as a mixer, can in some instances simultaneously receive and process multiple RF signals. As one example, these RF signals may be analog and digitally encoded signals. To this end, a receiver may include multiple signal processing paths, each including circuitry to process at least one type of downconverted signal obtained from a receiver front end. Furthermore, to provide for improved performance while maintaining reduced power consumption, one or more of these signal paths can be controlled to be enabled/disabled based on detection of a corresponding signal to be processed in that path. Thus a signal detector such as a power envelope detector or other such detector may be used to detect the presence of a valid signal within a received RF spectrum and to enable operation of a corresponding signal processor, as well as to potentially control configuration of the receiver front end.

Because in some instances the multiple desired signals may not be present in a given area in which the tuner is operating, the signal detector or other circuitry of the tuner (or coupled to the tuner) may cause enabling of only one of the signal processors when the output of that signal processor is to be used as an audio signal for output to an output device such as a speakers, earphones or the like. Furthermore, based on the type of the detected signals in the signal detector, various control signals may be provided both to a front end circuit as well as the signal processors to configure them for operation based on the type of signals detected.

For example, embodiments may be used to control power consumption by enabling only one of multiple demodulators present in a tuner. As used herein, the terms "digital radio" and "HD™ radio" are used interchangeably and are intended to correspond to radio communication that occurs digitally, e.g., as one or more sideband channels to a main analog signal channel. Such communications may be in accordance with various standards such as a National Radio System Committee (NRSC-5C), Digital Audio Broadcasting, Digital Radio Mondiale or other standard. This digital communication is also known as in-band on-channel (IBOC) broadcasting. Using an embodiment according to the present invention, significant power reductions can be realized, and which may be particularly suitable for a system operating on battery power, e.g., a portable device.

As discussed above, HD™ content can be provided as sidebands to an analog carrier signal. In current digital radio systems, the sidebands may include a plurality of subcarriers that are modulated according to an orthogonal frequency division multiplexing (OFDM) scheme in which one or more channels of digital content can be provided in sidebands adjacent to and on both sides of an analog radio signal.

Currently, many broadcasters transmit a bundled signal including both analog and digital information. The analog information is a conventional radio channel and may have a single sided bandwidth of approximately 100 kilohertz (kHz), centered around a carrier frequency at a midpoint of a channel spectrum that is approximately 200 kHz wide. In addition, one or more digital channels can be encoded into sidebands to this main signal channel. Because this information is in digital form various other information in addition to audio information, such as textual data, e.g., song titles, station information, news and so forth can be present. Also, the digital radio channels may have higher quality sound than the analog channel.

Due to the presence of both analog and digital channels that may include the same information, many receivers support a so-called hybrid mode in which existing analog reception can be augmented when a corresponding digital channel is available. In addition to one digital channel that is a simulcast of the analog channel, some broadcasters provide one or more additional digital channels or subchannels of a complementary nature, such as an all music, talk, news, sports or other broadcasts. Thus multiple digital channels can be present in the sidebands. Further, it is possible that some broadcasters will offer a fully digital transmission in which an entire radio channel is devoted to digital information, such that enhanced services such as increased data capacity, surround sound or other multicasting solutions can be made available across this bandwidth that might otherwise be used for an analog channel. Embodiments may provide for detection of valid digital signals and control of demodulators accordingly in any of these different environments.

Referring now to FIG. 1, shown is a block diagram of a radio receiver in accordance with an embodiment of the present invention. As shown in FIG. 1, radio receiver 10 may be integrated on a single semiconductor die, for example, according to a complementary metal oxide semiconductor (CMOS) process. This mixed signal receiver includes both an analog front end as well as a digital portion that can perform much of the signal processing digitally, reducing area and power consumption and greatly aiding in programmability, as well as providing for additional features.

As seen in FIG. 1, receiver 10 may be coupled to an antenna 20 that receives an incoming RF signal and provides the signal to an RF front end 30. Antenna 20 may be configured to receive various types of incoming RF signals including, for example, conventional broadcast signals such as AM and/or FM broadcast signals, sidebands to such signals that may include the same or different content, e.g., modulated according to a digital modulation scheme, other terrestrial signals, satellite signals, or so forth. As one specific example, a first RF signal may correspond to an analog signal of a conventional broadcast radio station and the second RF signal may correspond to a digital signal of that same radio broadcast. However, these two RF signals, which are in a relatively close bandwidth with respect to each other, may include substantially the same content or information, but modulated according to different modulation schemes (e.g., the analog signal modulated according to an FM scheme, while the digital signal is modulated according to, e.g., an orthogonal frequency division multiplexing (OFDM) scheme).

In the embodiment shown in FIG. 1, RF front end 30 may have a low-intermediate frequency (IF) architecture in which the output from the RF front end is at a low intermediate frequency. Front end circuit 30 may include a single mixer in some embodiments, to downconvert the incoming RF signals to a lower frequency. Front end circuit 30 may include further components such as gain control units, filters and so forth to thus process the incoming signals into a form to be handled by the downstream circuitry.

As further seen in FIG. 1, the low-IF signals are provided to an analog-to-digital converter (ADC) 40, which in one embodiment may be a one-bit delta-sigma converter, although the scope of the present invention is not limited in this regard. ADC 40 may operate at very high speeds to provide a digitized output. Note that while shown with these limited components in the embodiment of FIG. 1, understand that an analog front end of a receiver may include additional circuitry.

As seen further in FIG. 1, the digitized signals from ADC 40 may be provided to a digital signal processor (DSP) front end 50, which may perform various digital processing on the incoming digitized signals. For example, DSP front end 50 may perform channelization, e.g., via a CIC decimator. In some embodiments, other processing may be performed in this DSP front end such as image cancellation and so forth.

Still further, understand that the decimation and/or filtering performed in DSP front end 50 may vary in different embodiments. As one example, DSP front end 50 may output baseband complex signals, i.e., so-called in-phase (I) and quadrature (Q) signals, although in other embodiments the baseband signals need not be of complex character.

Furthermore, since processing may occur both for an analog signal as well as for digital signals present in sidebands to the analog channel, the baseband signals may be provided to a DSP 60 at various sampling rates. For example, the baseband signals may be decimated to a relatively slow speed (e.g., 400 kilosamples per second (kS/s)) for analog processing purposes, while for processing of the digital information present in the sidebands, the decimation may result in a relatively high speed signal transfer (e.g., 3 megasamples per second (MS/s)).

Note that while DSP front end 50 and DSP 60 are shown as separate blocks in the embodiment of FIG. 1, understand that in many actual implementations, both blocks may be present, along with all other blocks shown in FIG. 1, on a single semiconductor die, and are shown as separate blocks in FIG. 1 for ease of discussion.

As will be described further below, various processing may be performed in DSP 60, both on the analog signal information as well as the digital signal information. Specifically, the analog signal information may be demodulated in a demodulator portion of DSP 60, which digitally demodulates the incoming baseband signals corresponding to the analog signal channel. Understand that while this is a digital demodulation, the baseband signals that are demodulated are of an analog character; this is in contrast to the digital demodulation performed on digital radio signals, as the original transmitted signal information was of a digital source. The demodulated signals corresponding to the analog radio channel may be provided to a blending circuit of DSP 60 where, as discussed further below, the demodulated analog signal can be blended with a corresponding demodulated HD™ signal. In some embodiments, DSP 60 may perform various signal processing on the digital signal information, including various filtering as well as processing to perform a detection as to whether a valid HD™ signal is present. However, in other embodiments DSP 60 may be configured to handle processing only for analog signals.

As seen further in FIG. 1, the processed digital signal information can be provided to an HD™ demodulator 70, which may perform digital demodulation of this digital information. In some embodiments, HD™ demodulator 70 may be a licensed block of a third party. HD™ demodulator 70 may output a HD™ demodulated signal, e.g., according to an I²S protocol. As seen, this signal is fed back to DSP 60, where it may also be provided to the blending circuitry discussed above for blending with the corresponding analog signal.

The purpose of blending can be manyfold. Upon initialization of a system including a tuner, the analog demodulator initializes first and thus has a demodulated signal available for further processing and output faster than the HD™ demodulator can be initialized and provide a valid output signal. Accordingly, initially the analog demodulator can first output a valid analog demodulated signal. As such, the blending circuit can be controlled to perform no blending and simply output the analog demodulated signal. When the digital demodulator has successfully initialized and is ready to provide valid HD™ demodulated content (and assuming that the digital content is the same as the analog content), the blending circuitry may be controlled to execute a blending operation to smoothly switch the output from the analog demodulated output to the digital demodulated output. In various embodiments, a linear function may control blending of the two signals to thus provide a smoother transition from the analog to digital output (or vice versa). However, the scope of the present invention is not limited in this regard, and the blending between the two signals can occur in other manners.

Still further, blending may occur when a digital signal is lost at least temporarily or when the HD™ demodulator suffers an impairment, e.g., as determined based on signal quality metrics regarding the digital demodulated output. In similar fashion, when such impairment or digital signal loss occurs, blending between the analog and digital signals may occur to thus switch over to the analog demodulated output.

Blending can be controlled in different fashions in various embodiments. For example, in many implementations the digital demodulator may generate a signal, referred to as a blend control signal, which can be used to control blending operations. In some such implementations, the blending control signal may be asserted when valid digital demodulated samples are available to thus indicate that a blend operation should occur to switch from output from an analog demodulated signal to a digital demodulated signal. In other embodiments, instead of a single signal that is either asserted or de-asserted, different control signals may be provided, one of which to control a blend operation to switch output from analog to digital demodulated signals and a second control signal to switch output of from digital to analog demodulated signals. According to various embodiments, the actual blending operation in this direction may be delayed to allow time for the analog demodulator to be re-powered, since as described below, the analog demodulator may be disabled after the blend operation switches output to the digitally demodulated output.

In turn, the blending control signal may be de-asserted when it is determined that valid digital demodulated samples will no longer be available. When the digital demodulator determines that valid digital demodulated samples will no longer be available, because of buffering present in the HD™ demodulator (or associated therewith) when a signal impairment or signal loss is detected, some amount of valid HD™ demodulated output is still present and can be provided to allow for a predetermined time interval between detection of the signal impairment or loss and switching over to an analog demodulated output. Thus a delay can be tolerated between de-assertion of the blending control signal and the actual blending operation. This fact can be leveraged to disable or power down the analog demodulator when a valid HD™ signal is present. That is, this window of valid HD™ demodulated samples available when an impairment or loss is detected may be used to provide for re-powering of the analog demodulator to enable power savings while still providing for a smooth output of audio information from at least one of the analog and digital demodulated signals. Thus, where the selected digital channel is the same as the selected analog channel, blending may occur to resolve situations in which the digital channel is temporarily (or permanently) lost. As will be discussed below, such blending operations may be performed responsive to assertion/deassertion of a blend control signal from the HD™ demodulator.

Still with reference to FIG. 1, after blending and any other processing such as sample rate conversion, a digital audio signal representing the selected channel (and corresponding to samples of the analog, digital, and/or combined signals) is output from DSP 60, e.g., again according to an I²S protocol. Here the digital audio may be provided to various destinations such as an audio processor, which may be of a separate semiconductor die, in some embodiments. While shown with this particular implementation in the embodiment of FIG. 1, understand the scope of the present invention is not limited in this regard.

For example, in other implementations instead of a single semiconductor die, an arrangement may be present in which the analog circuitry and digital circuitry are present on different die. In such implementations, different front ends may be present for both the analog and digital circuitry. Nevertheless, the output from both signal processing units may be provided in a multicast system that blends the two outputs, as directed by a given controller. Furthermore, embodiments may be used in situations where the analog content and digital content encoded into RF signals are at different frequencies.

Figure 2:
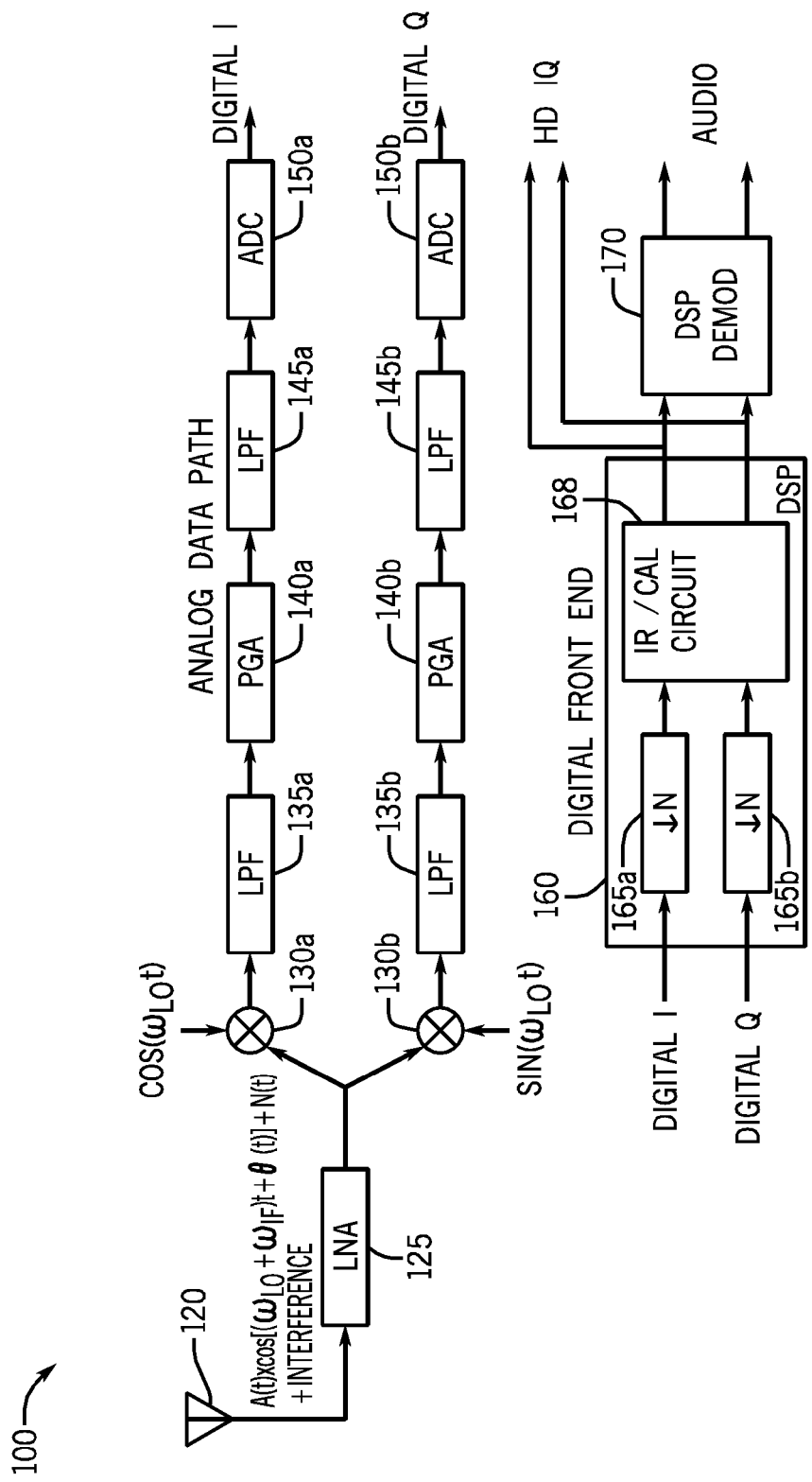
FIG. 2 is a block diagram of further details of a receiver in accordance with an embodiment of the present invention.

Embodiments may be implemented in many different types of systems. For example, selective powering of demodulators can be incorporated into various types of radios such as a standalone AM/FM receiver, or a multi-band receiver, such as an FM/AM/WB receiver. Referring now to FIG. 2, shown is a block diagram of a receiver in accordance with an embodiment of the present invention that shows some details of the analog front end section. As shown in FIG. 2, receiver 100 may be of a low-IF receiver architecture. In the embodiment of FIG. 2, receiver 100 is coupled to receive an RF signal via an antenna 120 that in turn is coupled to a low noise amplifier (LNA) 125. In turn, the RF signal may be provided to mixers $130_a$ and $130_b$. As seen in FIG. 1, the receiver may have a complex signal architecture having separate IQ phases, such that separate paths for I and Q-phases are provided. This is realized by mixers 130, each of which mix the received RF signal with a local oscillator (LO) frequency at different phases, namely 90° apart. In the embodiment of FIG. 2, mixers 130 may mix the incoming signal with a local oscillator frequency to generate an IF signal.

Various analog processing may then be performed on the IF signals. Specifically, each of the I and Q paths may include a first low pass filter (LPF) 135, a programmable gain amplifier (PGA) 140 and a second LPF 145. The bandwidth of these filters may be controlled based on whether an analog or digital demodulator is the powered demodulator. For example, in the absence of HD™ signals, a relatively narrow bandwidth, e.g., of approximately 200 kHz (for FM operations) may be set, while when a valid HD™ signal is detected, the bandwidth may be wider (e.g., approximately 400-500 kHz). As such, greater power consumption occurs even in the analog front end for HD™ operation. The resulting signal is then provided to an ADC 150, which converts the analog IF signals to digital I and Q signals, which may then be provided to a digital portion of the receiver. Note that while in many implementations receiver 100 may be configured as a single integrated circuit, e.g., a CMOS device configured on a single semiconductor die, the scope of the present invention is not limited in this regard.

The digital information may be provided to a digital portion of the receiver which may include a digital front end 160 that may perform various digital processing to prepare the signals for demodulation in a DSP 170, which may thus demodulate the signals and provide demodulated data to a desired location. As seen in FIG. 2, digital front end 160 may include programmable decimators 165 to control a sampling rate of the digital signals. Note that the programmable decimation ratio N can be controlled to handle various sampling rates, e.g., HD™ (744 kilosamples per second (KS/s)), FM (372 KS/s), WBRX (93 KS/s), AM (46 KS/s).

While shown as a single structure, understand that in some implementations a portion of such decimation may be performed in fixed digital hardware, while additional decimation may be performed using programmable logic. In addition, in the embodiment shown in FIG. 2 front end 160 may further include an image rejection/calibration circuit 168 to handle image rejection processing and to generate samples at a desired rate, and to thereafter provide digital samples to DSP 170. While shown with this particular implementation in the embodiment of FIG. 2, the scope of the present invention is not limited in this regard.

Figure 3:
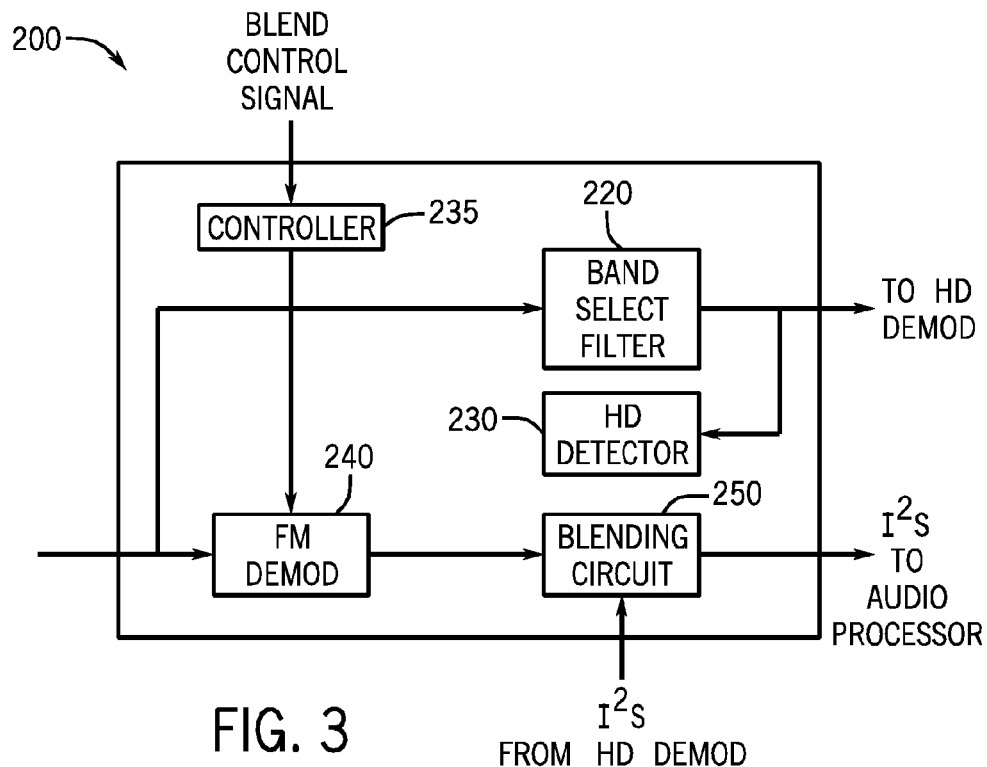
FIG. 3 is a block diagram of a portion of a digital signal processor (DSP) in accordance with an embodiment of the present invention.

Referring now to FIG. 3, shown is a block diagram of a portion of a DSP in accordance with an embodiment of the present invention. As shown in FIG. 3, DSP 200 may correspond to the portion of the DSP shown at block 60 in FIG. 1. As first seen in FIG. 3, incoming baseband signals are provided to the DSP portion. While these signals may be provided at multiple sample rates, e.g., a low speed sample rate and a high speed sample rate, for ease of discussion only a single path is discussed. As seen, the incoming signals can be provided to an analog processing path of the DSP. Note that while the terminology "analog" is used herein, understand that at this point of the signal processing path these signals are in digital form, and as used herein the term "analog path" is simply used to indicate that the processing path is for information present in the analog signal channel, i.e., the main signal channel.

Still with reference to FIG. 3, an analog FM demodulator 240 may be provided to perform demodulation of the conventional analog FM signal. As seen, demodulator 240 may be controlled by a controller 235. In various embodiments, controller 235 may control demodulator 240 to be powered on or powered off. Specifically, controller 235 may receive one or more incoming control signals. In the embodiment of FIG. 3, a blend control signal, which may be received from the HD™ demodulator can be used to control whether the analog demodulator is to be powered on or off. When powered on, the resulting demodulated signal (which is in digital audio form), may be provided to a blending circuit 250, discussed further below. Understand also that while the implementations described herein are for FM radio, embodiments are equally applicable to other radio bands, e.g., AM, WB or so forth.

Note also that the incoming signals may be provided to a band select filter 220. In general, band select filter 220 acts to filter out the analog signal channel information, leaving only the desired sideband information. The filtered output may be provided to the HD™ demodulator for demodulation of this digital information. In the embodiment shown in FIG. 3, the filtered signal is also provided to an HD™ detector 230. This detector may operate within the DSP, providing efficiency in power consumption as well as efficiency in speed of detection. The DSP may include or be associated with, in some embodiments, an article in the form of a computer-readable medium onto which instructions are written. These instructions may enable the DSP, including the controller and detector, or other programmable processor, to perform power control, digital radio detection and other processing as described herein.

With reference to blending circuit 250, in addition to receiving the conventional demodulated analog signal, it further receives the demodulated HD™ signal. Blending circuit 250 may be controlled to pass the HD™ audio signal when it is available and when not available, to pass the analog audio signal. Furthermore, during a transition between the two domains, blending circuit 250 acts to blend the two signals to provide for a smooth transition between the two domains, enabling continuous radio reception so that the transition between the two domains is unnoticed by a user. In some embodiments, the blending control signal may be received directly from the HD™ demodulator. In other implementations, the blending control signal, generated by the HD™ demodulator, may be provided to another processor of a system in which the tuner is included. For example, in some embodiments the blending control signal may be provided to a host processor, which can either do the blending operations onboard, or provide control signals to the DSP to perform any blending as well as any other required control operations, such as powering up/down the analog demodulator. While shown with this particular implementation in the embodiment of FIG. 3, understand the scope of the present invention is not limited in this regard.

Figure 4:
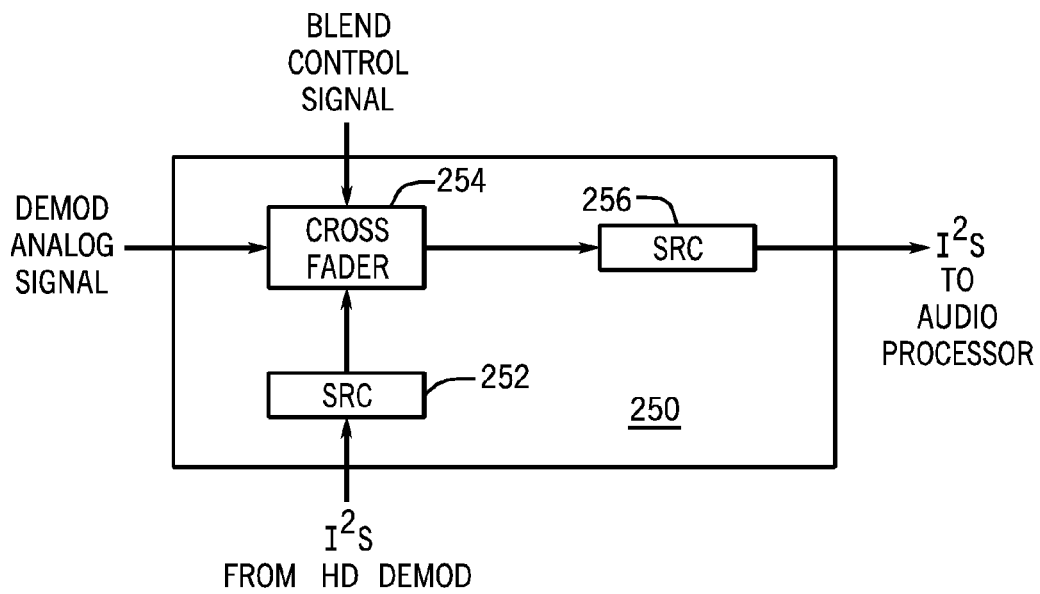
FIG. 4 is a block diagram of a blending circuit in accordance with an embodiment of the present invention.

Referring now to FIG. 4, shown is a block diagram that further details a blending circuit in accordance with an embodiment of the present invention. As shown in FIG. 4, blending circuit 250 includes a cross-fader 254 that receives the demodulated analog signal as well as the demodulated HD™ signal. Note that the HD™ signal may pass through a sample rate converter 252 prior to being provided to cross-fader 254.

In various embodiments, the blending control signal, which may be received from the HD™ demodulator, controls a selection as to which signal is passed, and controls a blending during a transition. In various embodiments, this blending control signal itself may be digital, with a logic low level meaning that an analog signal is to be passed, while when it is logic high, the HD™ signal is to be passed. Further, on a transition between low to high or vice versa, cross-fader 254 may act to blend the two signals, e.g., according to a linear function that occurs over a predetermined time period. In other embodiments, this control signal may be received from another location, e.g., a host processor of a system in which the tuner is present. The output of the cross-fader 254 may be provided to another sampling rate circuit 256, which can resample the digitized signal to a desired rate, e.g., a rate of a downstream audio processor. As seen, this output may be communicated via an I²S link to an audio processor or other location. While shown with this particular implementation in the embodiment of FIG. 4, understand that the scope of the present invention is not limited in this regard.

Figure 5:
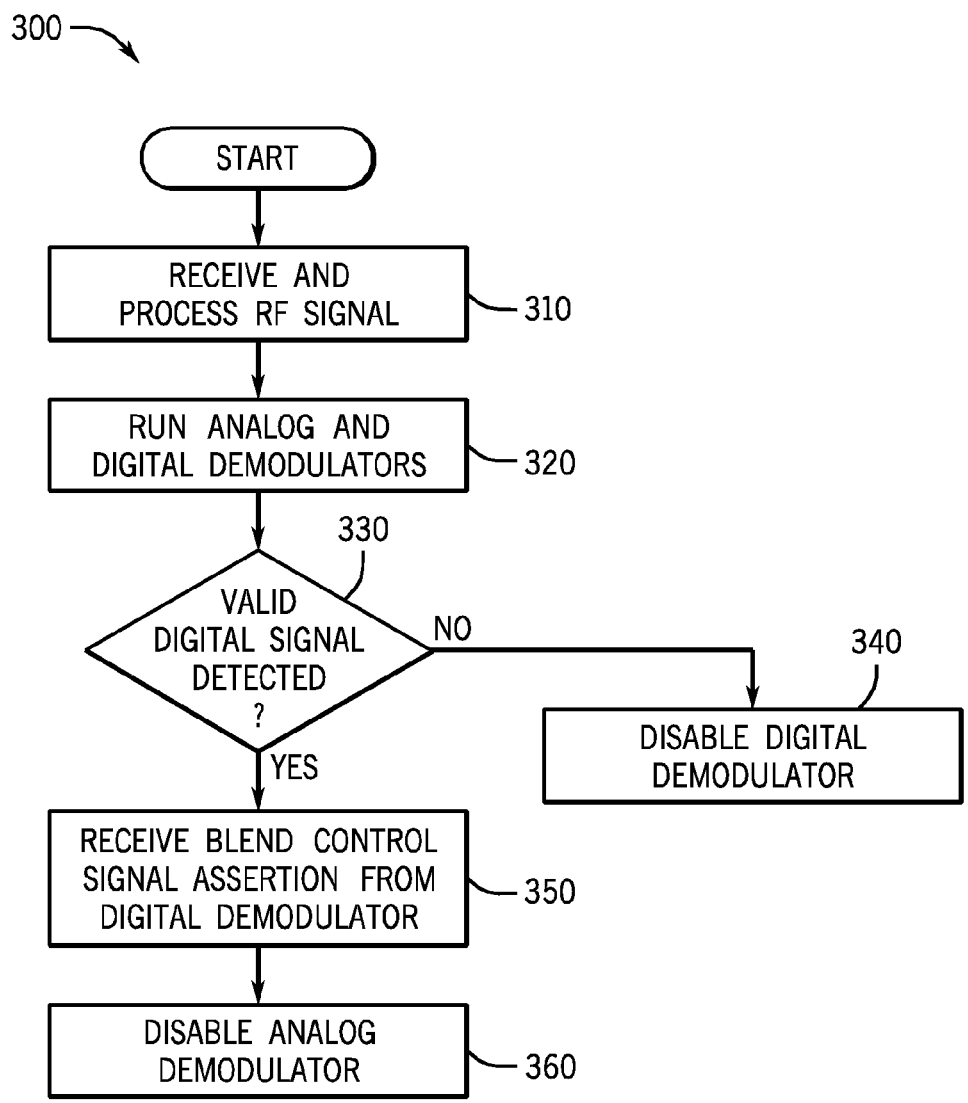
FIG. 5 is a flow diagram of a method for an initial blending operation in accordance with one embodiment of the present invention.

Referring now to FIG. 5, shown is a flow diagram of a method for processing incoming radio signals to perform an initial blend operation in accordance with an embodiment of the present invention. As shown in FIG. 5, method 300 may be performed within a DSP, microcontroller or other portion of a radio tuner or system in which the tuner is adapted. As seen, method 300 may begin by receiving and processing an incoming RF signal (block 310). More specifically, this RF signal may be received via an antenna and provided to an analog front end for various processing to obtain downconverted signals. The downconverted signals may be provided to demodulation circuitry. For example, with reference back to FIG. 1, such demodulation circuitry may be present in DSP 60 and digital demodulator 70.

Accordingly, at this time both the analog and digital demodulators may be operating (block 320). It may then be determined whether a valid digital signal is detected (diamond 330). Note that detection of a digital signal within the incoming RF signal can occur in various forms in different embodiments. For example, in one embodiment a HD™ detector present within the DSP 60 may perform the detection. Alternately, the HD™ demodulator itself may perform the detection. It is possible further that detection of a valid digital signal can occur in other locations in certain implementations. As further seen in FIG. 5, if no valid digital signal is detected, control passes to block 340 where the digital demodulator may be disabled. Accordingly, power consumption may be reduced as the digital demodulator need not run when a valid digital signal is not present in the incoming RF signal.

If instead at diamond 330 it is determined that a valid digital signal is present, control passes to block 350. At block 350, a blend control signal may be received from the digital demodulator. More specifically, this blend control signal may have a state change occurring thereto, namely an assertion to a logic high state to indicate that valid digital content is now available within the digital demodulator. In different implementations, this blend control signal may be received in different locations. As one example, the signal may be received within the DSP, e.g., DSP 60 of FIG. 1. Alternately, a host processor of a system can receive the signal and take appropriate action responsive to this assertion signal.

From block 350 control passes to block 360 where the analog demodulator may be disabled. That is, because valid digital content has been detected, the output from the radio tuner may correspond to this digital signal, as it has higher quality audio. Accordingly, to reduce power consumption, the analog demodulator may be disabled. If the blend control signal is received directly in a DSP that includes the analog demodulator, the DSP may cause the analog demodulator to be powered down. If in contrast the blend control signal is provided to another location such as a host processor, the host processor may in turn send a control signal to the DSP to cause the analog demodulator to be powered down. Note that the selective power control of FIG. 5 assumes that the digital content is the same as the analog content, or that the digital content is supplemental content and is the desired audio for the tuner as requested by the user. While shown with this particular implementation in the embodiment of FIG. 5, understand the scope of the present invention is not limited in this regard.

Thus after execution of method 300 shown in FIG. 5, the analog demodulator is powered down and the digital demodulator is powered up and is providing demodulated signals for output from the radio tuner. Assume that at a later time, the valid digital signal that has been detected is lost or suffers an impairment, e.g., due to movement of the radio tuner, which may be of a mobile device such as a cellular telephone, personal media player, PDA, or of a car stereo system. In such instances, re-powering of the analog demodulator may occur to thus provide at least an analog demodulated output that can be used to still provide valid radio reception and output for a desired channel, and to cause the digital demodulator to be powered off.

Figure 6:
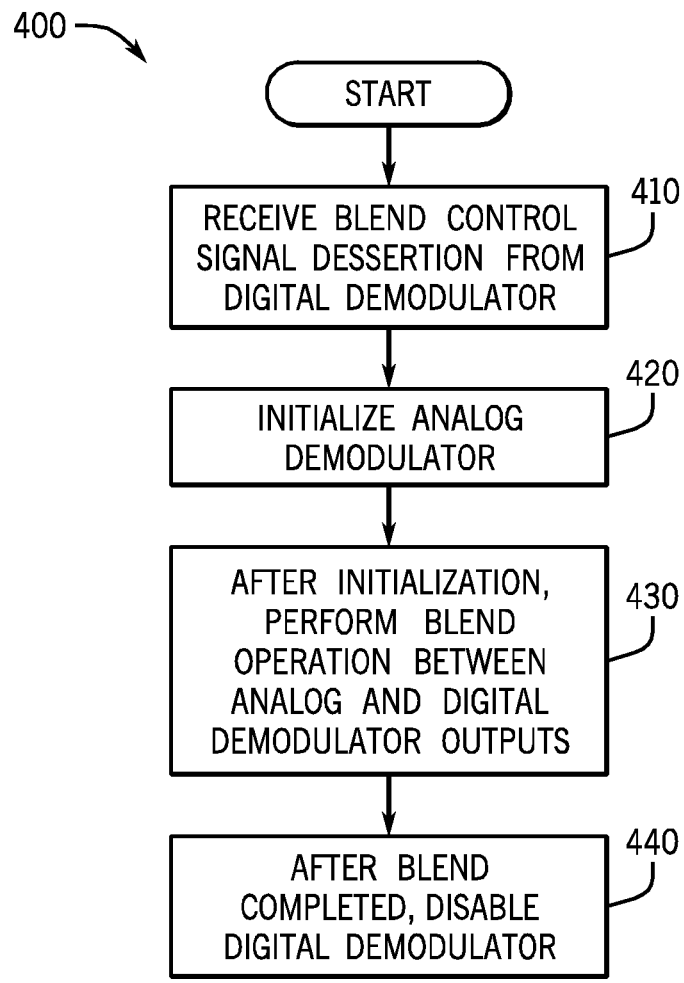
FIG. 6 is a flow diagram of a method for a further blending operation in accordance with another embodiment of the present invention.

Referring now to FIG. 6, shown is a flow diagram of a method for re-powering an analog demodulator in accordance with an embodiment of the present invention. As shown in FIG. 6, method 400 may begin by receiving a blend control signal deassertion from the digital demodulator (block 410). However, no blend operation is immediately initiated, as instead a delay period occurs to provide for re-powering of the analog demodulator. Here, when the digital demodulator determines that its signal quality metrics have fallen below a threshold level, the blend control signal may be generated. While different signal quality metrics are possible, in some embodiments these metrics may include a signal-to-noise ratio (SNR), a received signal strength indication (RSSI) or other such signal quality metrics, e.g., a bit error rate (BER), or so forth. Note that when the digital demodulator detects that its signal quality metrics have fallen below a threshold, some amount of valid demodulated digital signals may still be available, e.g., in an output buffer of the digital demodulator. While the scope of the present invention is not limited in this regard, in some embodiments the depth of this buffer may provide samples sufficient to provide for approximately 100 milliseconds (ms) of valid digital demodulated signals after detection of a signal quality threshold failure.

Still referring to FIG. 6, at block 420 the analog demodulator may be initialized. Various operations may be performed to initialize the analog demodulator. For example, in one embodiment such initialization operations may include increasing the DSP clock rate and re-starting FM demodulation software, as in such embodiment the analog demodulator uses the same front end tuner as the digital demodulator. Thus initialization of the analog demodulator may be performed relatively quickly. For example, in some embodiments initialization may take between approximately 0.1 and 10 milliseconds. Accordingly, there is sufficient time to repower and initialize the analog demodulator prior to loss of valid digital demodulated signal output from the HD demodulator.

The control signal to cause powering up and initialization of the analog demodulator (which can be a blend control signal deassertion or a separate control signal) can be received from various locations, namely the entity that received the blend control signal deassertion from the digital demodulator. As discussed above in various embodiments this entity may be a controller within the DSP that includes the analog demodulator or a host processor the system.

As seen in FIG. 6, control next passes to block 430 where after initialization of the analog demodulator a blend operation may be performed between the analog and digital demodulator outputs. To this end, outputs from both demodulators may be provided to the blend control unit, which may perform any synchronization needed between the two signals, power level control and so forth, and to cause a blending to occur to provide a blended output signal. As discussed above, in some implementations this blend operation may be according to a linear function, although the scope of the present invention is not limited in this regard. At the conclusion of the blending operation, which may take on the order of between approximately 20 ms to 1000 ms or wider milliseconds (and may be on the order of approximately 100 ms for a mobile application), the output from the radio tuner may correspond to the analog demodulator output. Accordingly, control passes to block 440, where the digital demodulator may be disabled. That is, because valid digital demodulation cannot occur, e.g., due to signal impairment or loss, the digital demodulator may be powered down to reduce power consumption. While shown with this particular implementation in the embodiment of FIG. 6, understand the scope of the present invention is not limited in this regard.

Figure 7:
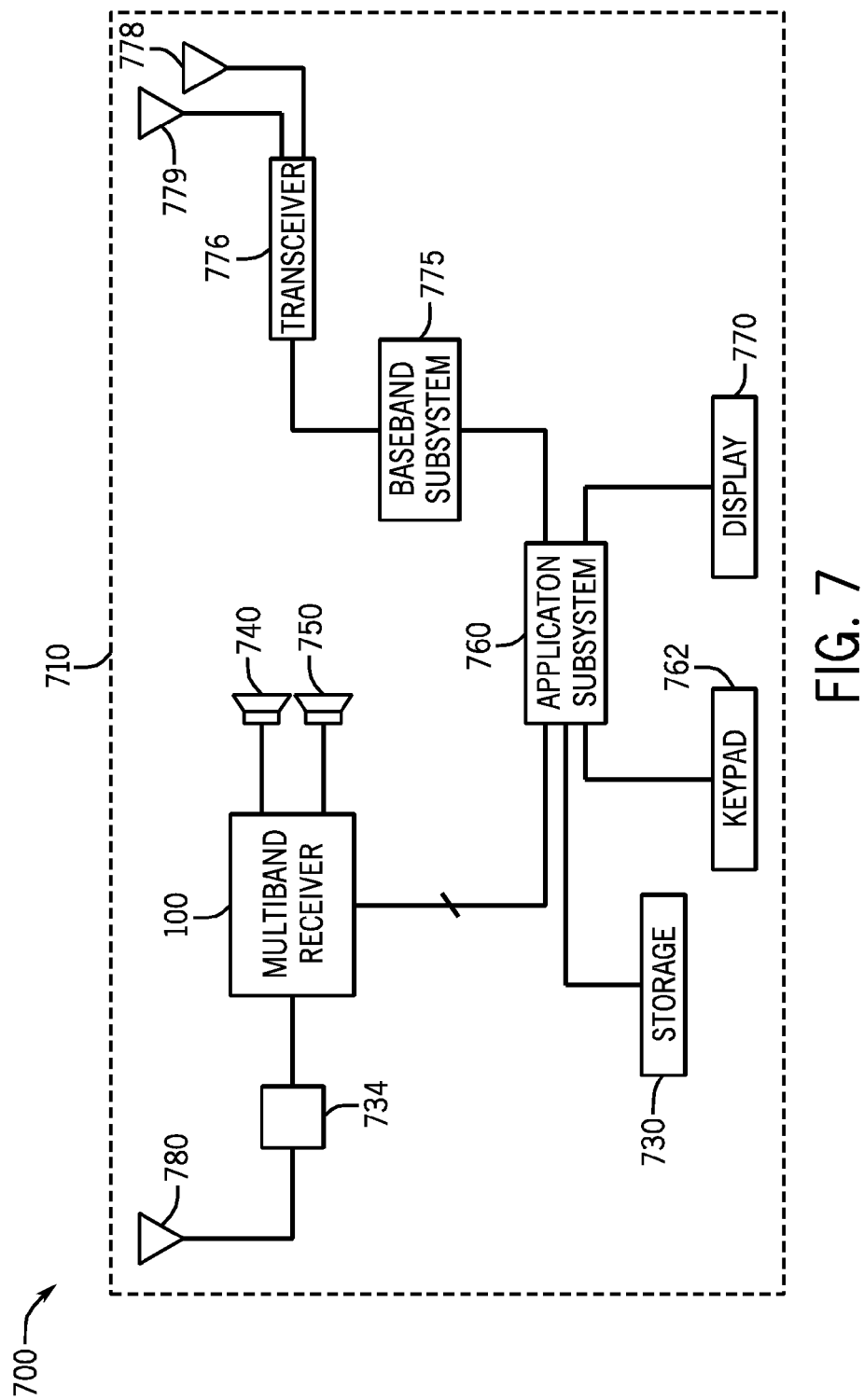
FIG. 7 is a block diagram of a system in accordance with an embodiment of the present invention.

Embodiments may be implemented in many different system types. Referring to FIG. 7, in accordance with some embodiments of the invention, a multiband receiver 100, which may include multiple demodulators in accordance with an embodiment, may be part of a multimedia portable wireless device 710, which in turn is part of a wireless system 700. As examples, the wireless device 710 may be a multi-function, multi-band radio, cellular telephone, smart phone, PDA, tablet computer, mobile game device, or so forth and may play music or book downloads, and may be part of a wireless link between a satellite antenna and a radio receiver, a terrestrial receiver, etc.

Among its other various functions, the wireless device 710 may store digital content on a storage 730, which may be a flash memory or hard disk drive, as a few examples. The wireless device 710 generally includes an application subsystem 760 that may, for example, receive input from a keypad 762 of the wireless device 710 (which may be a touch pad, e.g., of a display 770) and display information on display 770. Furthermore, the application subsystem 760 may generally control the retrieval and storage of content from the storage 730 and the communication of, e.g., audio from receiver 100. As shown, receiver 100 may be directly connected to speakers 740 and 750 for output of audio data (understand that in some embodiments a separate audio processor may be integrated between the receiver and speakers). As depicted in FIG. 7, the multimode receiver 100 may be coupled by a matching network 734 to a receiver antenna 780.

In accordance with some embodiments of the invention, the wireless device 710 may have the ability to communicate over a communications network, such as a wide area, local area, or personal wireless network. For these embodiments, the wireless device 710 may include a baseband subsystem 775 that is coupled to the application subsystem 760 for purposes of encoding and decoding signals for this wireless network. Baseband subsystem 770 may be coupled to a transceiver 776 that is connected to corresponding transmit and receive antennas 778 and 779.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
an analog demodulator to receive a first downconverted signal obtained from a radio frequency (RF) signal and to process the first downconverted signal to output a first signal obtained from analog encoded content of the RF signal;
a blending circuit to blend the first signal and a second signal, the second signal received from a digital demodulator, the second signal obtained from digitally encoded content of the RF signal; and
a controller to disable the analog demodulator responsive to the digital demodulator indicating that the second signal is available from the digital demodulator.

2. The apparatus of claim 1, wherein the apparatus comprises a digital signal processor (DSP) including the analog demodulator, the blending circuit, and the controller.

3. The apparatus of claim 2, wherein the controller is to enable the analog demodulator responsive to the digital demodulator indicating that the second signal will no longer be available from the digital demodulator.

4. The apparatus of claim 3, wherein the DSP is to receive a first control signal from a host processor to indicate that the second signal is available from the digital demodulator, the host processor to generate the first control signal responsive to receipt of a blend control signal from the digital demodulator.

5. The apparatus of claim 3, wherein the blending circuit is to perform the blend, according to a linear function, the first and second signals into a blended demodulated signal and to output the blended demodulated signal to an audio processor as a digital stream, wherein the blend is to be performed after a delay period initiated responsive to receipt of the digital demodulator indication.

6. The apparatus of claim 1, wherein the digital demodulator is to indicate that the second signal will no longer be available responsive to a signal quality metric for the second signal being below a threshold level, and wherein the digital demodulator includes a buffer having a sufficient number of stored samples of the second signal to enable the analog demodulator to generate the first signal and the blending circuit to perform the blend prior to the buffer being emptied.

7. A method comprising:
receiving a blend control signal in a controller, the blend control signal to indicate that a limited number of valid demodulated samples from a digital demodulator that demodulates digitally encoded content in a radio frequency (RF) signal remain in a buffer;
initializing an analog demodulator that demodulates analog encoded content in the RF signal responsive to the blend control signal;
demodulating a downconverted signal obtained from the RF signal in the analog demodulator to generate an analog demodulated output;
after the initialization and demodulating, blending the analog demodulated signal and at least some of the limited number of valid demodulated samples in a blending circuit to generate a blended output; and providing the blended output to an audio processor coupled to the blending circuit.

8. The method of claim 7, further comprising after performing the blending, disabling the digital demodulator.

9. The method of claim 8, further comprising thereafter detecting presence of valid digitally encoded content in the RF signal, and enabling the digital demodulator.

10. The method of claim 9, further comprising:
receiving the blend control signal from the digital demodulator to indicate that valid digital samples are available in the buffer;
responsive to the blend control signal, blending the analog demodulated signal and the valid digital samples for a predetermined time period; and
thereafter disabling the analog demodulator and providing the valid digital samples to the audio processor.

\* \* \* \* \*